United States Patent
Shim et al.

(10) Patent No.: US 9,117,377 B2
(45) Date of Patent: Aug. 25, 2015

(54) DYNAMICALLY-CHANGEABLE ABDOMINAL SIMULATOR SYSTEM

(71) Applicant: SMSRTUMMY LLC, Honolulu, HI (US)

(72) Inventors: Walton Shim, Honolulu, HI (US); Larry Martin, Kailua, HI (US); John Salle, Honolulu, HI (US)

(73) Assignee: SmarTummy, LLC, Honolulu, HI (US)

( * ) Notice: Subject to any disclaimer, the term of this patent is extended or adjusted under 35 U.S.C. 154(b) by 0 days.

(21) Appl. No.: 14/208,196

(22) Filed: Mar. 13, 2014

(65) Prior Publication Data

US 2014/0272879 A1    Sep. 18, 2014

Related U.S. Application Data

(63) Continuation-in-part of application No. 13/965,143, filed on Aug. 12, 2013.

(60) Provisional application No. 61/799,471, filed on Mar. 15, 2013.

(51) Int. Cl.
*G09B 23/32*    (2006.01)

(52) U.S. Cl.
CPC ..................................... *G09B 23/32* (2013.01)

(58) Field of Classification Search
CPC ........ G09B 23/28; G09B 23/36; G09B 23/30; G09B 23/32
See application file for complete search history.

(56) References Cited

U.S. PATENT DOCUMENTS

2008/0227073 A1*    9/2008    Bardsley et al. .............. 434/267

OTHER PUBLICATIONS

SMBE AGM, Aug. 2011, p. 4, "ABSIM: Abdominal Palpation Training Simulator", by Burrow et al.

* cited by examiner

*Primary Examiner* — Timothy A Musselman
(74) *Attorney, Agent, or Firm* — Leighton K. Chong

(57) ABSTRACT

A dynamically-changeable abdominal simulator system comprises a patient manikin having an abdominal cavity covered by a sheet of synthetic skin, a grid array of inflatable cells emplaced within the abdominal cavity covering respectively distinct areas of pressurization of the abdominal cavity and supplied with pressurized medium under separate and independent inflation control in order to simulate a wide range of abdominal ailments and/or conditional expressions thereof. In a preferred embodiment, the inflation cells of the grid array are each made of semi-rigid material for maintaining a fixed cell shape and contain an inflation balloon for pressurizing cell turgidity.

14 Claims, 17 Drawing Sheets

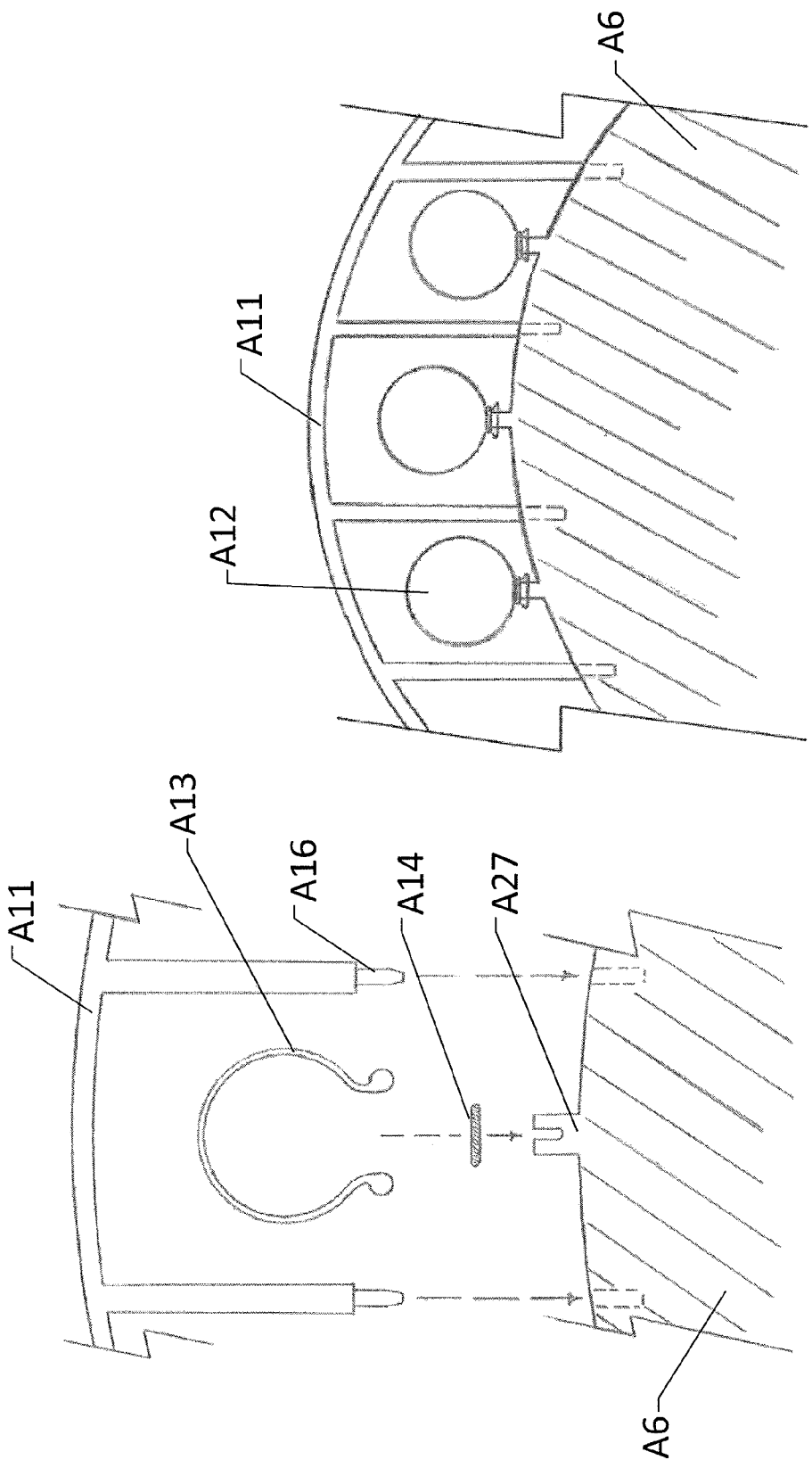

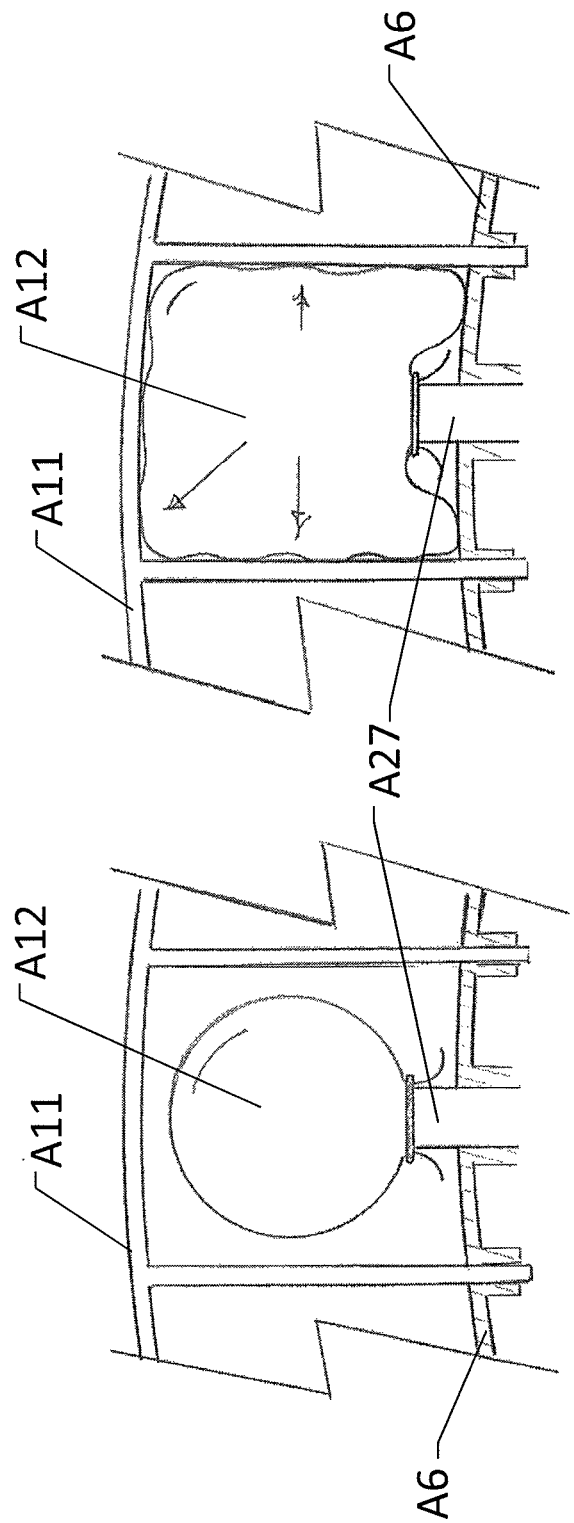

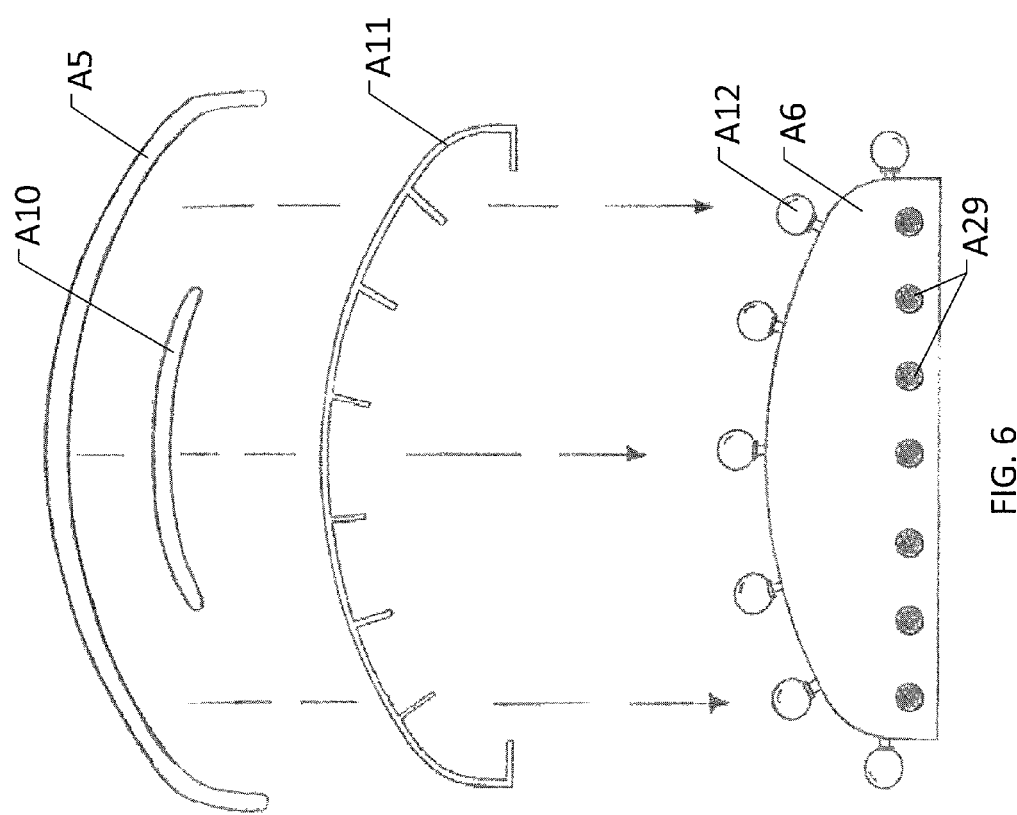

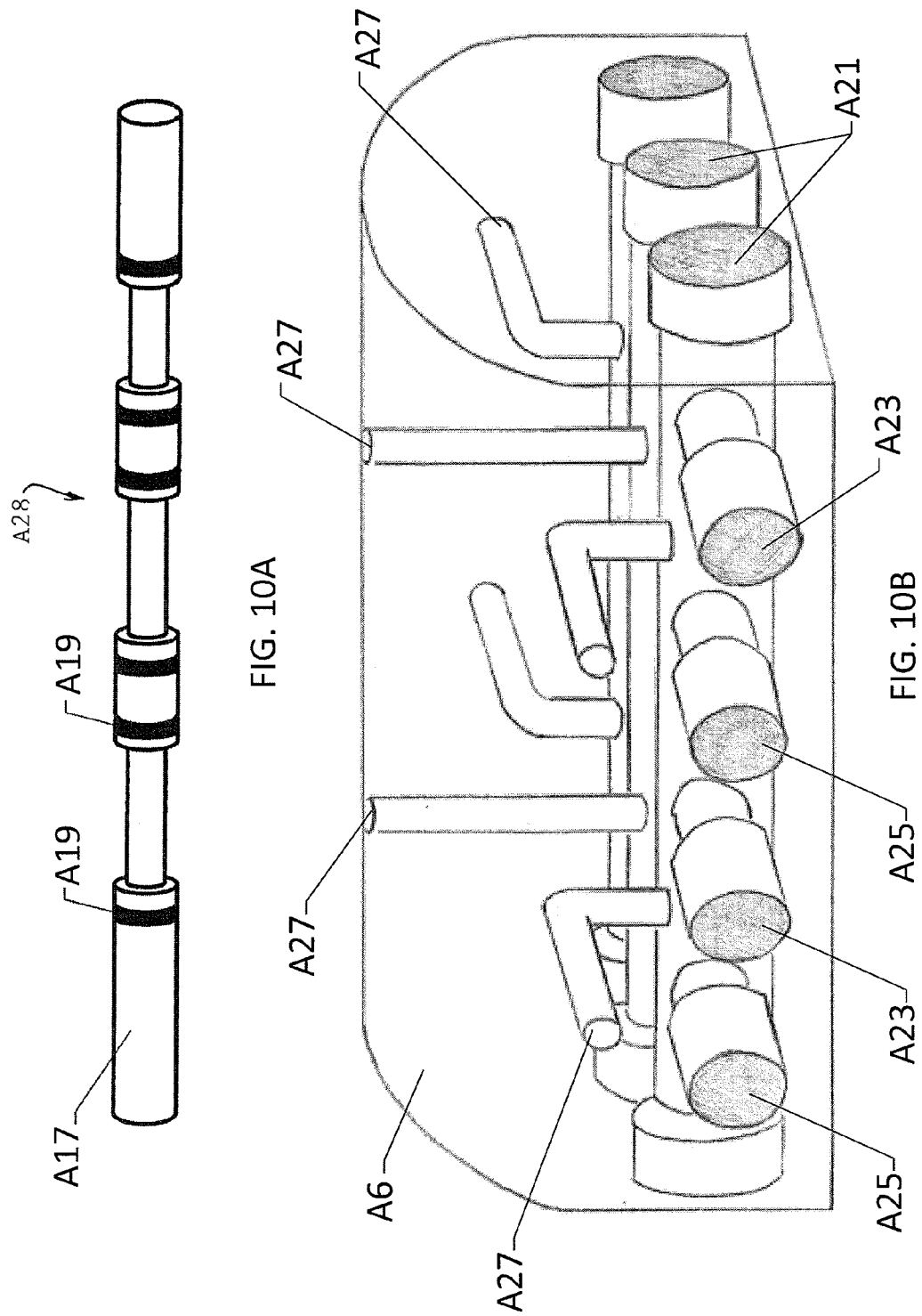

DYNAMICALLY-CHANGEABLE ABDOMINAL SIMULATOR SYSTEM

This U.S. patent application is a continuation-in-part of and claims the priority benefit of U.S. patent application Ser. No. 13/965,143 filed on Aug. 12, 2013, of the same title and having inventors in common herewith, which claimed the priority benefit of U.S. Provisional Application 61/799,471 filed on Mar. 15, 2013, having inventors in common herewith, both of which are incorporated by reference herein.

BACKGROUND OF INVENTION

The invention in this U.S. patent application relates to the field of biomedical simulation devices, and more specifically, to a patient simulator manikin for training for abdominal palpation examination.

While many different types of patient manikin training simulators are available in today's market, they are generally limited by having one or more static or single-function organs or body elements for simulating a single, specific subject condition for medical students, nurses and paramedics to train on. A patient manikin simulator called "SimMan", which is commercially available from Laerdal Medical AS, Wappingers Falls, N.Y., enables a training host to simulate a specific abdominal ailment, but is unable to replicate other abdominal disorders, such as appendicitis, ectopic pregnancy, and cancer of the abdomen. Commercially marketed simulators currently available are purely static and require a manual change to reconfigure the abdomen contents to simulate a different disorder. For example, to simulate a distended bladder, the "healthy" bladder model would be removed from the torso and replaced with a "distended" version. To simulate a different condition or a dynamically changing condition, different abdominal organ models or body elements must be manually interchanged into the manikin abdominal cavity.

In order for trainees to gain a wide range of experience training on a patient manikin simulator, it is deemed desirable to provide a patient manikin simulator that can simulate a wide range of different or dynamically changing medical conditions, without having to manually interchange abdominal organ models or body elements.

SUMMARY OF INVENTION

In accordance with the present invention, a dynamically-changeable abdominal simulator system comprises a patient manikin having an abdominal cavity covered by a sheet of synthetic skin, which contains an array of inflatable cells covering distinct areas of pressurization over a length and width of a tactile surface of the abdominal cavity. The inflatable elements are separately and independently supplied with a pressurized medium so that they can be dynamically configured to simulate a wide range of abdominal ailments and/or conditional expressions thereof, thereby providing an effective simulator training tool for practicing abdominal palpation exams. The inflation system for pressurization of the array of inflatable elements employs an electronic control module with an on-board microprocessor. The electronic control module communicates with an external computer that provides a graphical user interface for the user to run software-programmed simulation routines in conjunction with the operation of the manikin.

In a preferred embodiment, the array of inflatable elements is arranged as a grid of inflatable cells in a plurality of x rows and y columns defining distinct unit areas of pressurization. An inflation manifold employs x-y electronically controlled valves controlled by the electronic control module to inject pressurized medium into or discharge it from the inflatable cells. The electronic control module is embedded in the manikin with the inflation manifold for portability, and communicates with an external computer, laptop, or mobile device that provides a graphical user interface (GUI) for the user to run software-programmed simulation routines. The GUI interface is designed to allow a user to readily select from a wide range of abdominal ailments and to operate the inflation system under software control. This enables the array of inflatable cells to be dynamically configured in the manikin's abdominal cavity to mimic any selected ailment and/or conditional expressions thereof. For example, an abdominal ailment such as hepatomegaly (enlarged liver) can be simulated by inflating several cells in the liver's position of the grid-array with varying pressures to replicate the outline shape in and feel of a hepatomegaly condition.

In a particularly preferred embodiment, the synthetic skin covers the manikin torso from the chest down to the pubis. Underneath the skin layer are several synthetic bone structures that will emulate the ribcage and iliac crests and are fused to the manikin torso. Additionally, the abdominal cavity contains a grid array of inflatable cells having discreet cell surfaces spanning the tactile surface over the entire abdominal cavity. Each inflatable cell within the grid array is individually addressable and can be inflated or deflated separately to localized variations in turgidity. The grid array of inflatable cells is covered by a single subdural inflatable layer that spans the entire grid array that allows the system to simulate general swelling of the abdominal area. Another small subdural inflatable layer is placed on top of the inflatable grid covering the lower abdomen to simulate localized swelling and distention of the lower abdomen common to ailments such as a distended bladder.

The grid array of inflatable cells in composed of soft, non-elastic inflatable forms, inside of which are elastic, inflatable balloons. The rigidity of each inflatable form is controlled by manipulating the pressure inside the inflatable balloon, analogous to inflating the inner tube of a car tire. Each elastic inflatable balloon is affixed to an inflation port on a base surface of the manifold, whose form the inflatable balloons to be oriented normal to the outer tactile surface covering the abdomen. The inlet of the inflatable balloon is installed on the inflation port of the manifold with a fastening device. The inelastic forms are secured over each of the elastic inflatable balloons to contain the inflatable balloons within the grid cells. Between the subdural inflatable layer and the outer, simulated skin of the torso, lies a subdural layer of smooth material that allows the outer, simulated skin material to slide freely above the inflatables, much in the same way human skin can move over the abdomen.

Inflation is accomplished using a manifold system capable of both hydraulic and pneumatic fluid flow connected to the inflatables. The manifold is engineered using moveable piston shafts and either hydraulic or pneumatic valves aligned in a row/column format where each piston shaft is individually controlled using an electronic actuator that is either a liner actuator, push/pull solenoid, air valve, or the like. The hydraulic or pneumatic valves are also electronic and individually controlled. Each piston shaft is aligned with a valve in a row/column orientation. When fluid flow is supplied from a valve and a piston is energized in one direction, a pressure differential induces inflation of each balloon attached to a port on the manifold that is opened. The flow of pressurized medium into and out of the manifold is accomplished using separate supply and exhaust channels in the manifold. These channels are separated using ring gaskets fitted onto the piston shaft. Movement of the piston allows for opening and closing of the fill and exhaust channels.

Depending on the abdominal ailment(s) being simulated, varying degrees of turgidity (pressure supplied to each inflatable cell) are implemented to create a given tactile sensation when palpated. Pressure sensor control circuits determine the amount of pressurized medium inflated into each inflatable cell and transmits user feedback indicating which inflatable cells were palpated. All sensor and manifold actuator and valve control is accomplished using an embedded system composed of a printed circuit board (PCB) with a microcontroller. Both the inflation manifold and PCB control module are housed inside the manikin chest cavity for added portability.

The abdominal simulator system of the present invention enables realistic and dynamically changeable abdominal conditions to be simulated for training medical, nursing, and paramedic students to palpate and accurately diagnose a wide range of abdominal ailments and/or conditional expressions thereof. The associated user control interface enables an operator to dynamically simulate a comprehensive training environment, including changing conditions, associated sounds, medical images, and training videos for a wide range of abdominal ailments (e.g., appendicitis, gallbladder disease, distended bladder, abdominal distension, hernia, enlarged spleen, etc.) in an instantaneous fashion.

Other objects, features, and advantages of the present invention will be explained in the following detailed description of the invention having reference to the appended drawings.

BRIEF DESCRIPTION OF DRAWINGS

FIG. 4A shows a cross-section side view of the components used to construct one inflatable cell within the inflatable grid, and FIG. 4B is taken from the same view zoomed out to reveal several elastic inflatable cells connecting to the inflation manifold.

FIG. 5A shows a cross-section side view of an inflatable cell with the elastic inflatable in a non-pressurized state, and FIG. 5B shows the same inflatable cell with the elastic inflatable in a pressurized state.

FIG. 6 shows a side view of the layered components used to assemble the inflation system.

FIG. 10A shows an angled view of the piston shaft, and FIG. 10B shows the inflation manifold block (without inflatables attached) with intersecting tubes internal to the block.

DESCRIPTION OF PREFERRED EMBODIMENTS

Figure 1:
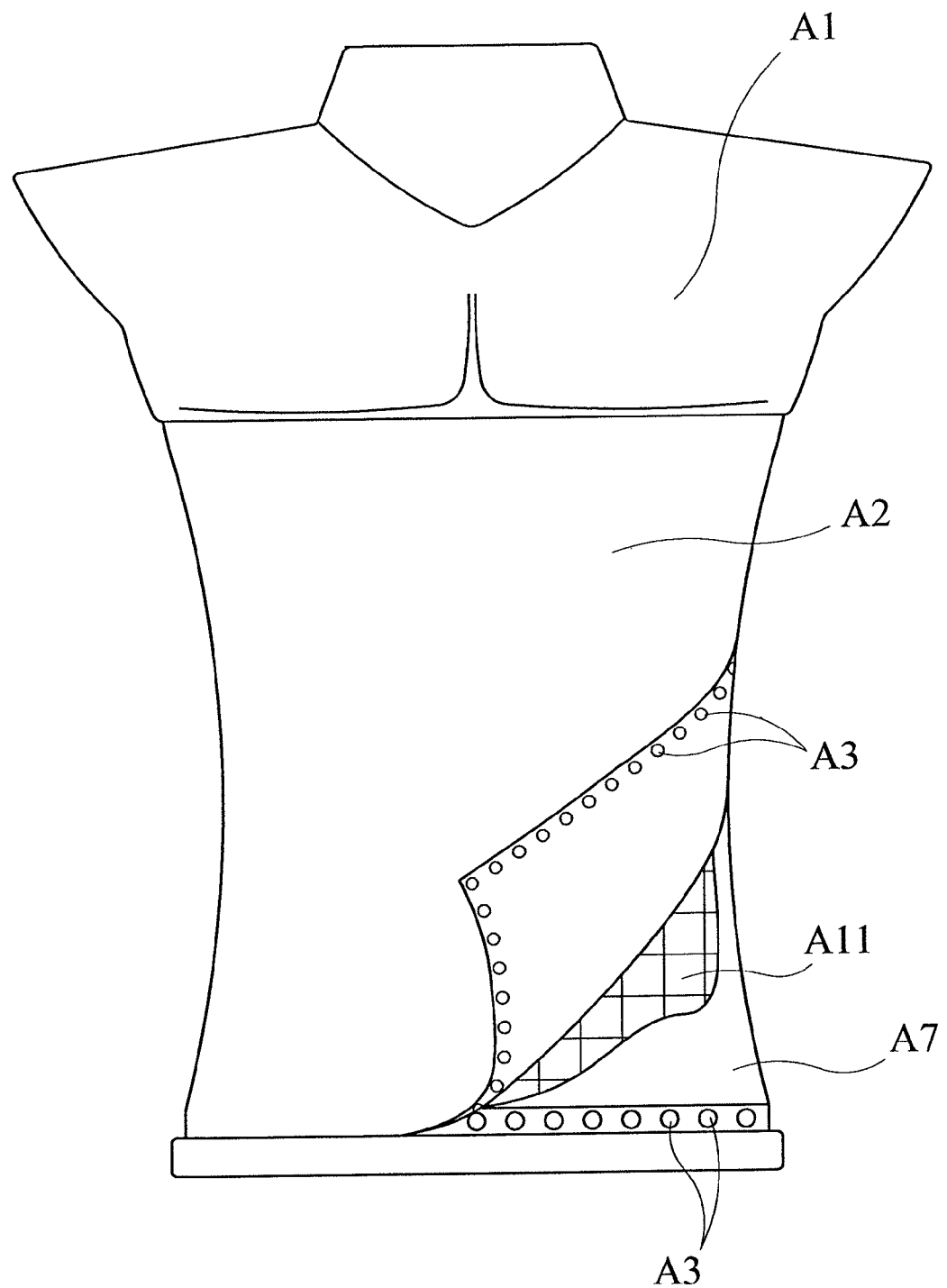
FIG. 1 is an external perspective view of a preferred embodiment of a patient manikin for abdominal training simulations in accordance with the present invention.

In the following detailed description of the invention, certain preferred embodiments are illustrated providing certain specific details of their implementation. However, it will be recognized by one skilled in the art that many other variations and modifications may be made given the disclosed principles of the invention.

REFERENCED PARTS AS NUMBERED IN THE DRAWINGS

A1 Manikin torso shell
A2 Synthetic skin made from silicone compound
A3 Fastening snaps for synthetic skin piece
A4 Indented mounting rim for synthetic skin
A5 Subdural inflatable layer covering entire abdomen
A6 Inflation manifold block
A7 Synthetic shell structure
A8 PCB for simulator control
A9 Synthetic ribcage
A10 Small subdural inflatable layer for lower abdomen
A11 Grid of inflatable cells
A12 Elastic inflatable
A13 Elastic inflatable (cross-sectional view)
A14 Fastener for elastic inflatable
A15 Single inflatable cell cover
A16 Press fitment fastener
A17 Piston shaft
A18 Cross-section view of piston shaft
A19 Ring gasket
A20 Cross-section view of ring gasket
A21 Cylinder tube that houses the piston shaft
A22 Cross-section view of A21
A23 Fill port; Cylinder tube connected to valve that allows or inhibits fluid flow
A24 Cross-section view of A23
A25 Exhaust port; Cylinder tube used to exhaust inflatable membranes
A26 Cross-section view of A25
A27 Port connecting inflatable tubing to the manifold
A28 Areal cross-section of A27
A29 Threaded plug screwed into manifold used to stop fluid leakage
A30 Electronic fluid valve (pneumatic or hydraulic)
A31 Electronic actuator (linear actuator, push/pull solenoid, air valve, or the like)
A32 PCB for pressure sensor mounting and control
A33 Pressure sensor A34 Gasket between PCB and manifold A6
A35 Fastener
A36 Inflatable cover shaped like a kidney
A37 Inflatable cover shaped like a spleen
A38 Inflatable cover shaped like a liver
A39 Inflatable cover shaped like a bladder
B1 Microcontroller
B2 SPI level converter
B3 Analog to digital converter
B4 ADC connector
B5 Input/Output expander
B6 Input/Ouput expander connector
B7 UART level converter
B8 USB/Ethernet adapter
B9 Bluetooth/WiFi converter In its overall concept, a dynamically-changeable abdominal simulator system comprises a patient manikin having an abdominal cavity covered by a sheet of synthetic skin and containing an array of inflatable elements covering distinct areas of pressurization within a given length and width of abdominal cavity. In a simplified embodiment, an inflatable element may be shaped like a balloon into which an inflation needle coupled to the end of the inflation tubing is inserted. The inlet to the balloon simply wraps around the inflation tubing end and is sealed using a tie fastener or small hose clamp. A manifold for distribution of a pressurized medium such as air or liquid couples the tubings from the inflatable elements to a source of pressurized medium, for example, a portable air compressor or tank of compressed air. The manifold may have an array of valve-control knobs that controls the supply of pressurized medium into the inflatable elements. Using a simulation control routine for a specific abdominal ailment, the operator can control inflation or deflation to each of the inflatable elements for a calculated amount of time, in order to configure the abdominal cavity for a desired ailment.

In an alternative, more mechanically complex embodiment, the abdominal cavity may contain an array of rows and columns of inflatable elements made of semi-rigid material to retain a defined shape and spanning the entire abdominal cavity. Inflation is accomplished using an inflation manifold system connected to the inflatable elements via tubing. For a pressurized medium of compressed air, the manifold may have moveable ported slats aligned in row/column format where each slat is individually controlled using push/pull solenoids. An airbox is used in the manifold design to create a pressure differential to induce inflation of each element when a port to the element is opened. The flow of air into and out of the manifold is accomplished using a separate supply and exhaust valve solenoid. Depending on the abdominal ailment(s) being simulated, varying degrees of rigidity (or pressure in each element) are implemented to create a given tactile sensation when palpated. Pressure sensor control circuits determine the amount of air inflated into each element and transmits user feedback indicating which inflatables were palpated.

The above-described embodiments were disclosed in the prior U.S. patent application Ser. No. 13/965,143 filed on Aug. 12, 2013, of the same title and having inventors in common herewith, which is incorporated in its entirety by reference herein In the present application, a preferred embodiment is disclosed having a grid array of inflatable cells made of semi-rigid material to retain their shape forming a discrete area in a tactile surface spanning the abdominal cavity. The inflatable cells are fixated in position at their top and bottom faces. Attached to the bottom of the abdominal cavity is a grid support structure that mimics the contour of the abdominal cavity. Tubing for each inflatable cell extends from the grid support structure and attaches to each inflatable cell. The top of each inflatable cell is fused to a single membrane of low elastic modulus material that spans the abdominal cavity region. This membrane is attached to the underside of the manikin walls to keep the inflatables fixated in place. Inflation is accomplished using a manifold system capable of both hydraulic and pneumatic fluid flow connected to the inflatables via tubing. The manifold mechanism uses moveable piston shafts and either hydraulic or pneumatic valves to supply the pressurized medium to the inflatable cells. The pressure sensor control feedback used to configure a given ailment is accomplished in the same way as the previously mentioned embodiment.

A particularly preferred embodiment of the dynamically-changeable abdominal simulation system in accordance with the present invention will now be described in detail.

Physical Layout

FIG. 1 shows a perspective view of a preferred embodiment of the present invention in its fully assembled state. A manikin torso A1 is formed as a shell of synthetic material containing an abdominal cavity which is removably covered by a synthetic skin covering A2. The synthetic skin covering A2 is shown in the drawing partially removed to reveal the shell structure A7 lined along its edges with fastening snaps A3 used to attach the skin covering A2 to the manikin torso. A grid array A11 of inflatable elements spans over a tactile surface covering the abdominal cavity. Other attachment methods may be employed to keep the skin in place, such as polyethylene hard snaps, mushroom head DualLock Velcro™, hook-and-loop Velcro™, and other suitable fasteners. The synthetic skin covering for the abdominal cavity of the manikin's torso may be a sheet of silicone underlined with thick foam, such as the synthetic skin sold by Lifelike BioTissues, of London, Ontario, Canada. The manikin torso may be designed so as to be portable and can be moved and placed on any flat surface.

Figure 2:
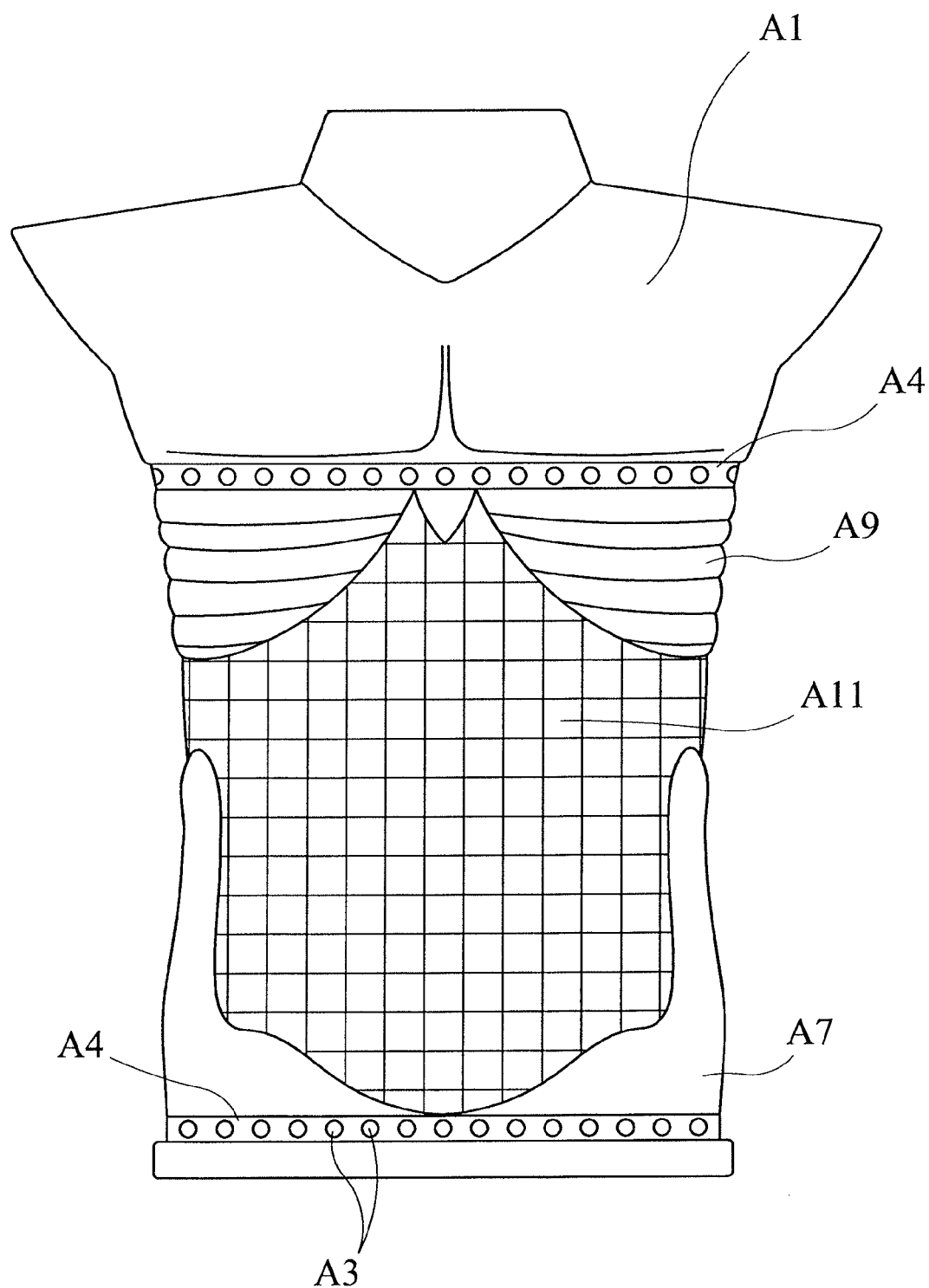
FIG. 2 is an external perspective view of the manikin torso with synthetic skin and subdural inflatable layers removed to reveal the inflatable grid cover and synthetic shell structure.

FIG. 2 shows a top view of the manikin torso A1 with the synthetic skin piece A2 (and a subdural covering) removed to reveal the grid array A11 of inflatable elements, synthetic shell structure A7 and synthetic ribcage A9. Additionally, the indented mounting rim A4 and fastening snaps A3 are revealed. The inflatable grid array A11 forms a tactile surface for palpation training of the abdominal cavity.

Figure 3A:
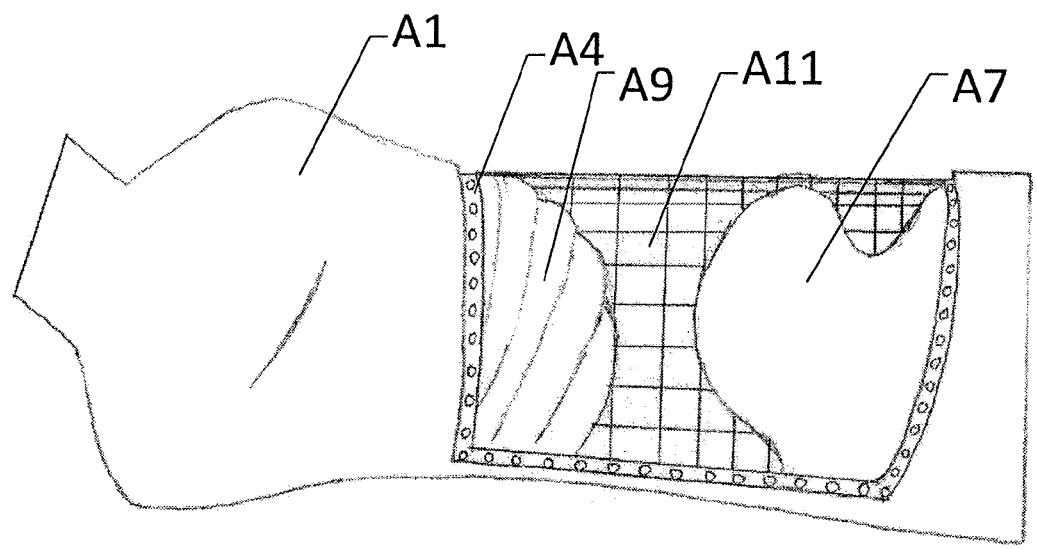
FIG. 3A shows a side view of the manikin torso without synthetic skin and subdural inflatable layers to reveal the inflatable grid cover.
Figure 3B:
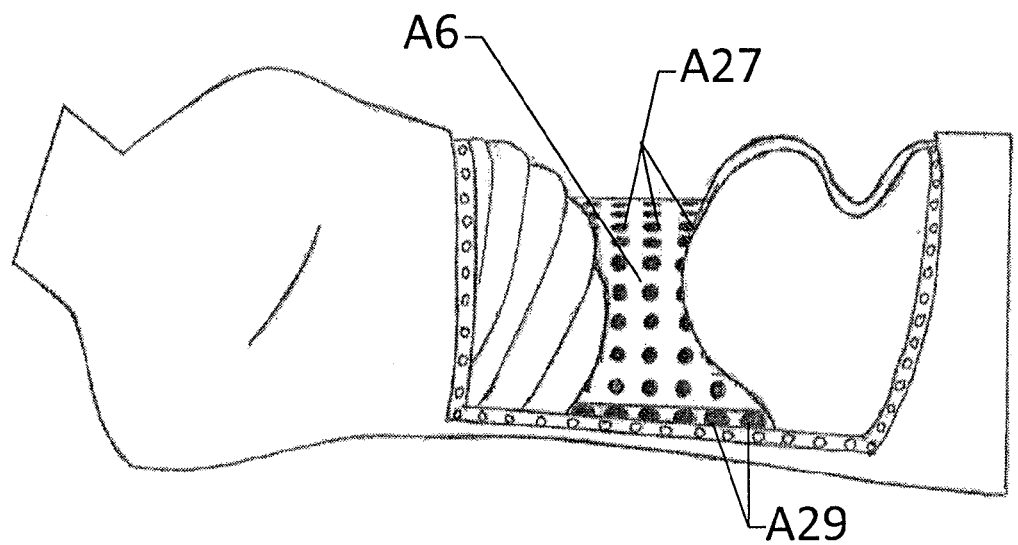
FIG. 3B shows the inflation manifold revealed by removing the inflatable grid cover and elastic inflatables.

FIG. 3A shows a side view of the manikin torso with the synthetic skin (and subdural covering described below) removed, and FIG. 3B shows it with the grid of array A11 of inflatable elements removed. In these views, the sides of the synthetic structures for the iliac crests A7 and ribcage A9 are shown. FIG. 3B reveals the underlying inflation manifold block A6 having an array of inflation ports A27. Since the manikin torso shell is open on the sides of the abdominal cavity, this allows for inflatable cells to be positioned for simulated palpation on the sides of the abdomen as well, as would take place during a simulated abdominal examination. A29 indicates the sealed plug ends of inflation channel tubes used in the manifold block A6.

FIG. 4A shows a partial cross-sectional view of the components used to assemble an individual inflatable cell within the inflation grid system. An elastic inflatable A13 (cross-sectional view) is attached to the inflation manifold block A6 over an individual inflation port A27. The elastic inflatable A13 can be held in place using any suitable fastener mechanism; in this case a ring fastener A14 is used. The inflation grid array A11 is formed as an integral grid cover structure that can be attached to the manifold block A6 using any suitable attachment mechanism; in this case press fitment pegs A16 are used to facilitate assembly. FIG. 4B is from the same viewpoint only zoomed out to reveal several cells of the inflation system. In FIG. 4B several elastic inflatables A12 are attached to the manifold block A6. The grid cover structure provides a smooth tactile surface that simulates the surface contour of the abdomen.

FIGS. 5A and 5B depict deflated and inflated states of an inflatable cell within the grid assembly. FIG. 5A shows the cell with an elastic inflatable A12 in a non-pressurized state, whereas FIG. 5B shows an elastic inflatable A12 in a pressurized state. In the pressurized state, the elastic inflatable conforms to the shape of the cell space within the grid covering A11. As the pressure increases, the cell increases in pressurized rigidity.

FIG. 6 shows an expanded side view of the inflation system assembly that is housed in the abdominal cavity of the manikin. A plurality of elastic inflatable balloons A12 is attached over respective inflation ports arranged over the base surface of the manifold block A6. Provided on the surface of the grid array A11 are a small subdural inflatable layer A10 in the location of the lower abdomen to present a symptom of localized distention in the area of the lower abdomen for ailments such as a distended bladder, and a large subdural inflatable layer A5 spanning the entire surface of the abdomen to present a symptom of overall abdominal distension or a healthy abdomen. The manifold block A6 assembled with the grid array A11 of elastic inflatable cells A12 and subdural inflatable layers A10 and A5 is positioned inside of the abdominal cavity of the manikin torso.

Figure 7:
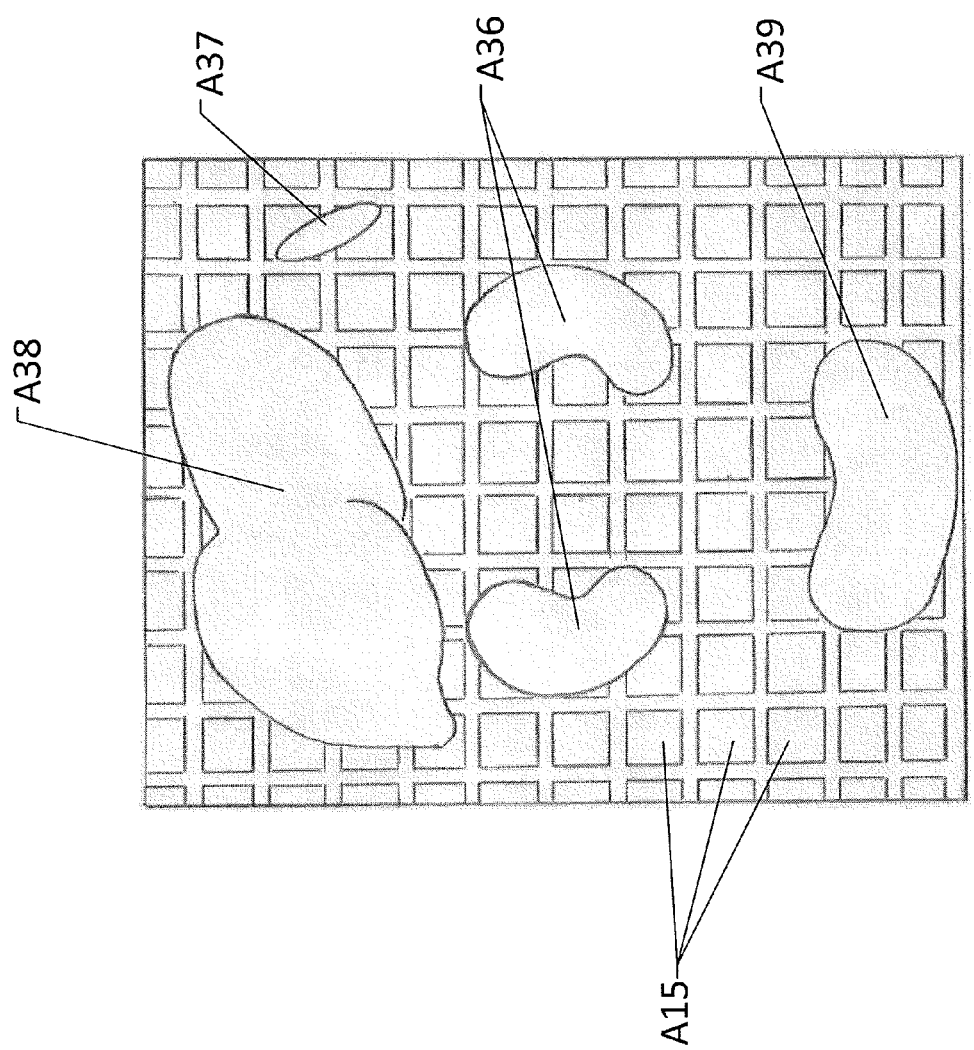
FIG. 7 shows an alternate method of covering the inflatable grid array using organ-shaped components.

FIG. 7 shows a plan view of an alternate inflation grid assembly. Instead of using a single grid covering such as A11, multiple coverings in the shapes of various organs can be used. The figure shows coverings in the shapes of organs such as liver A38, spleen A37, kidneys A36, and bladder A39 attached to the manifold block in the location of the abdomen where they are found in the body. Other areas are occupied by single-cell coverings A15. In this fashion, smooth edge transitions surrounding an organ can be simulated.

Figure 8:
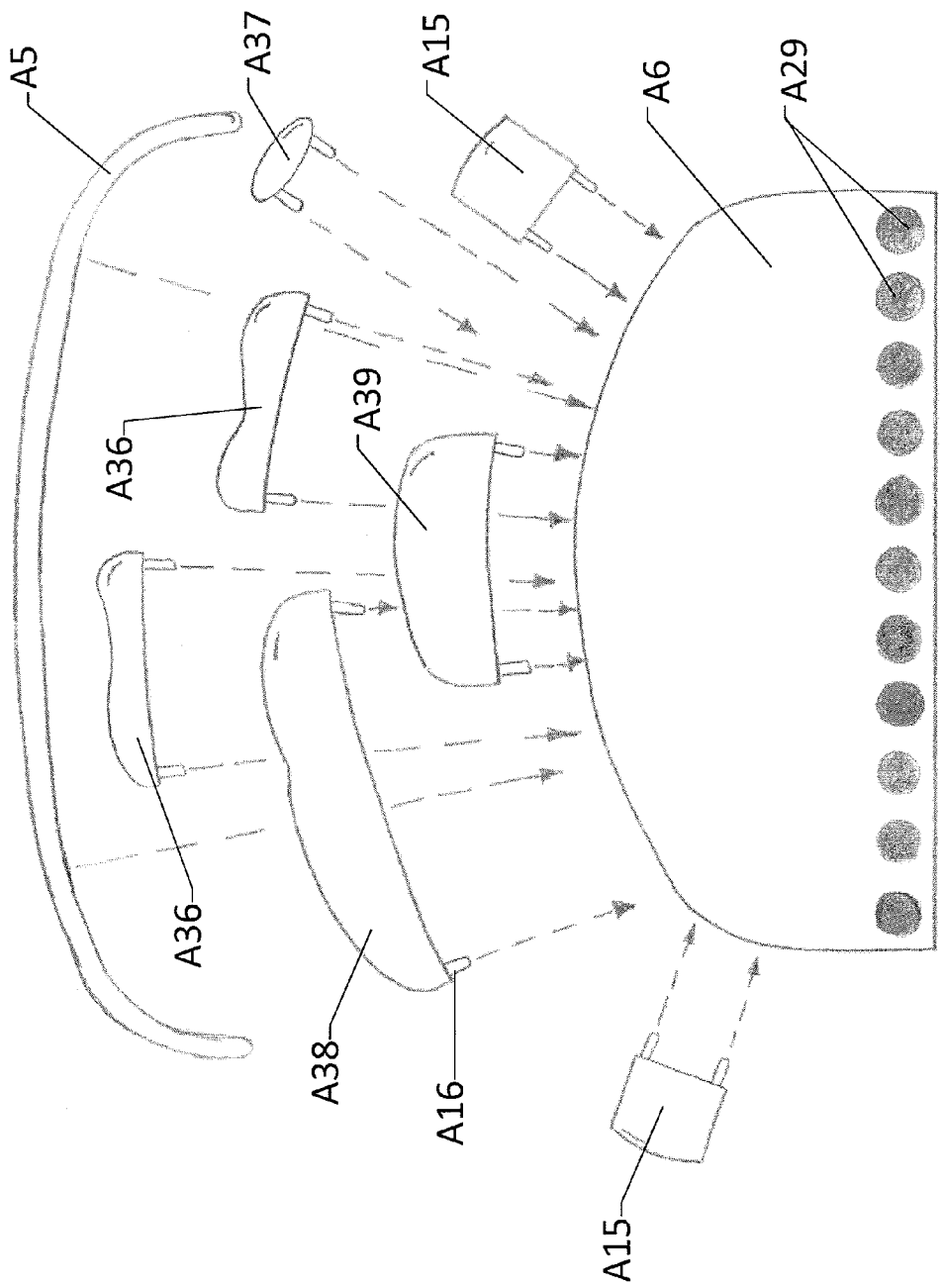
FIG. 8 shows an alternate construction of the inflation system using organ-shaped inflatable elements and single-cell elements.

FIG. 8 shows an expanded side view of the inflation system assembly in FIG. 7 using single-cell coverings A15 and organ-shaped inflation grid coverings A36, A37, A38, A39 (instead of the single inflation grid cover A11). The coverings can be attached to the manifold block A6 in the same way using press fitment pegs A16 or the like.

Figure 9:
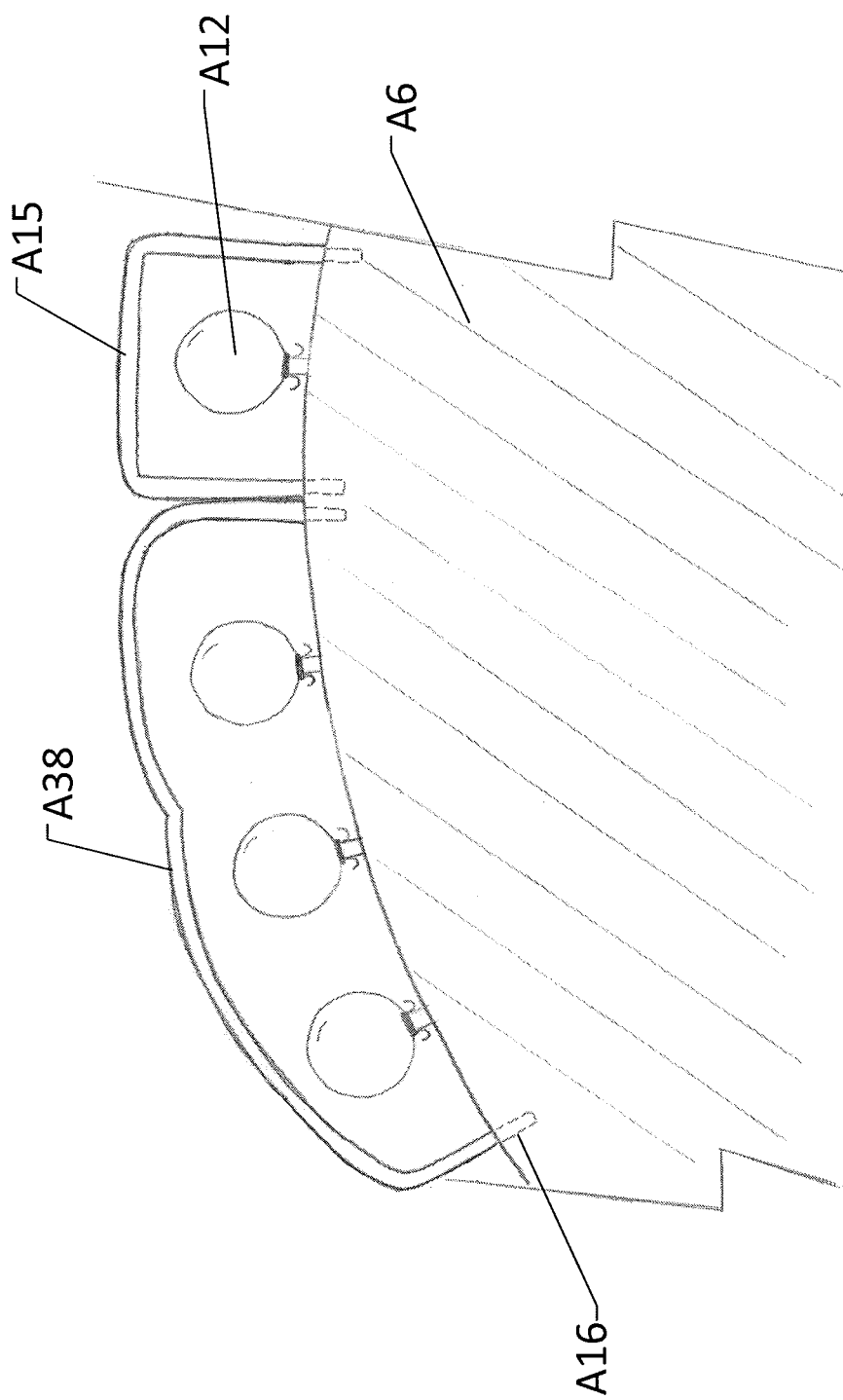
FIG. 9 shows a cross-cut side view of an organ-shaped cover and a single-cell cover attached to the manifold.

FIG. 9 shows a partial cross-section view of the components used to assemble two inflatable cells, one in the shape of a liver A38, and one single-cell cover A15. In this configuration, several elastic inflatable balloons are used to inflate the location under an organ-shaped cover. In this example three elastic inflatable balloons A12 are enclosed by the liver grid cover A38. In this fashion sections of the organ can be inflated with differing turgidity depending on the ailment being simulated. Additionally, localized turgidity not in the areas of the organs can be simulated in other areas of the abdomen by the use of the single-cell inflatable covers A15.

Mechanical Operation

FIG. 10A shows a piston shaft A28 having enlarged sections A17 for blocking the flow of pressurized medium in the manifold block A6 alternating with smaller diameter sections for allowing flow of pressurized medium. FIG. 10B shows a manifold system with six inflation ports A27 for attachment of inflatable balloons thereto. To increase the number of inflatable balloons the manifold can control, a manifold can be fabricated with more intersecting tubes that will connect to the valves and actuators. The manifold block A6 is made from one piece of machined metal or hard plastic. A grid of intersecting tubes A23 and A25 are arranged in a transverse direction and tubes A21 in a longitudinal direction. One end of each tube is of larger diameter and internally threaded (for sealing by a threaded plug A29). The inflation ports A27 communicate with one of the control tubes A21 housing a piston shaft A28 for controlling the flow of pressurized medium. One set of intersecting tubes A23 connect to valves that will pump pressurized medium into the manifold. Another set of alternating tubes A25 are used for exhaust channels to empty pressurized medium from the inflatable elements. To reduce the wear the piston shafts will experience over time due to friction and to keep the system sealed, well-lubricated ring gaskets A19 are attached to machined grooves in the shaft sections A17.

Figures 11A, 11B:
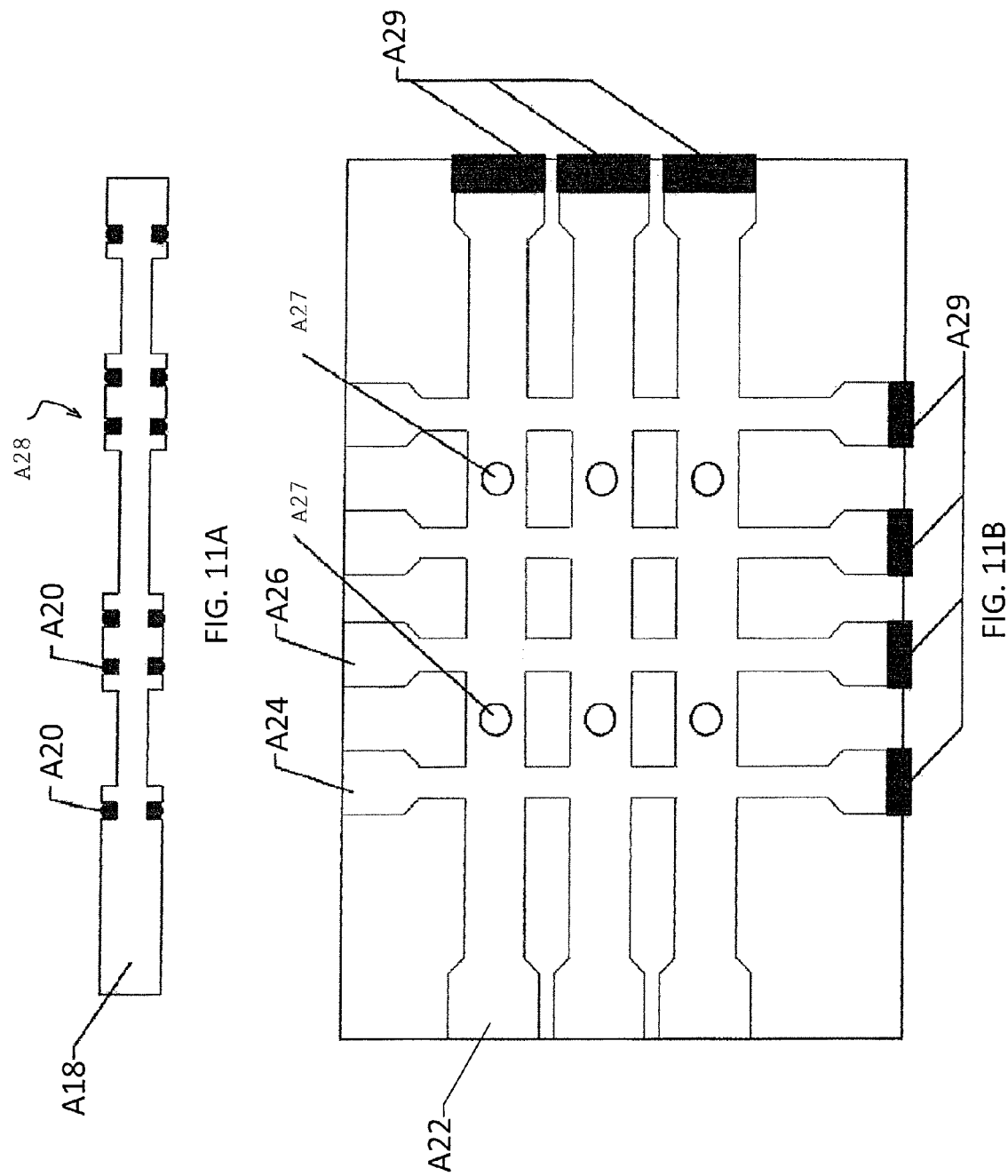
FIG. 11A shows an external perspective cross-cut view of the piston shaft.
FIG. 11B shows the inflation manifold.

FIG. 11A shows a cross-cut view of the piston shaft showing the cross-section A18 for the enlarged sections A17 and the gasket recesses A20 for the gaskets A19. FIG. 11B shows a cross-cut view of the inflation manifold A6, in which A22 indicates the internal channels for the control tubes A21, while A24 indicates the inflow channels for tubes A23 and A26 indicates the outflow channels for tubes A25. The channels A22 for controlling pressurized medium flow are shown without a piston inserted.

Figure 12:
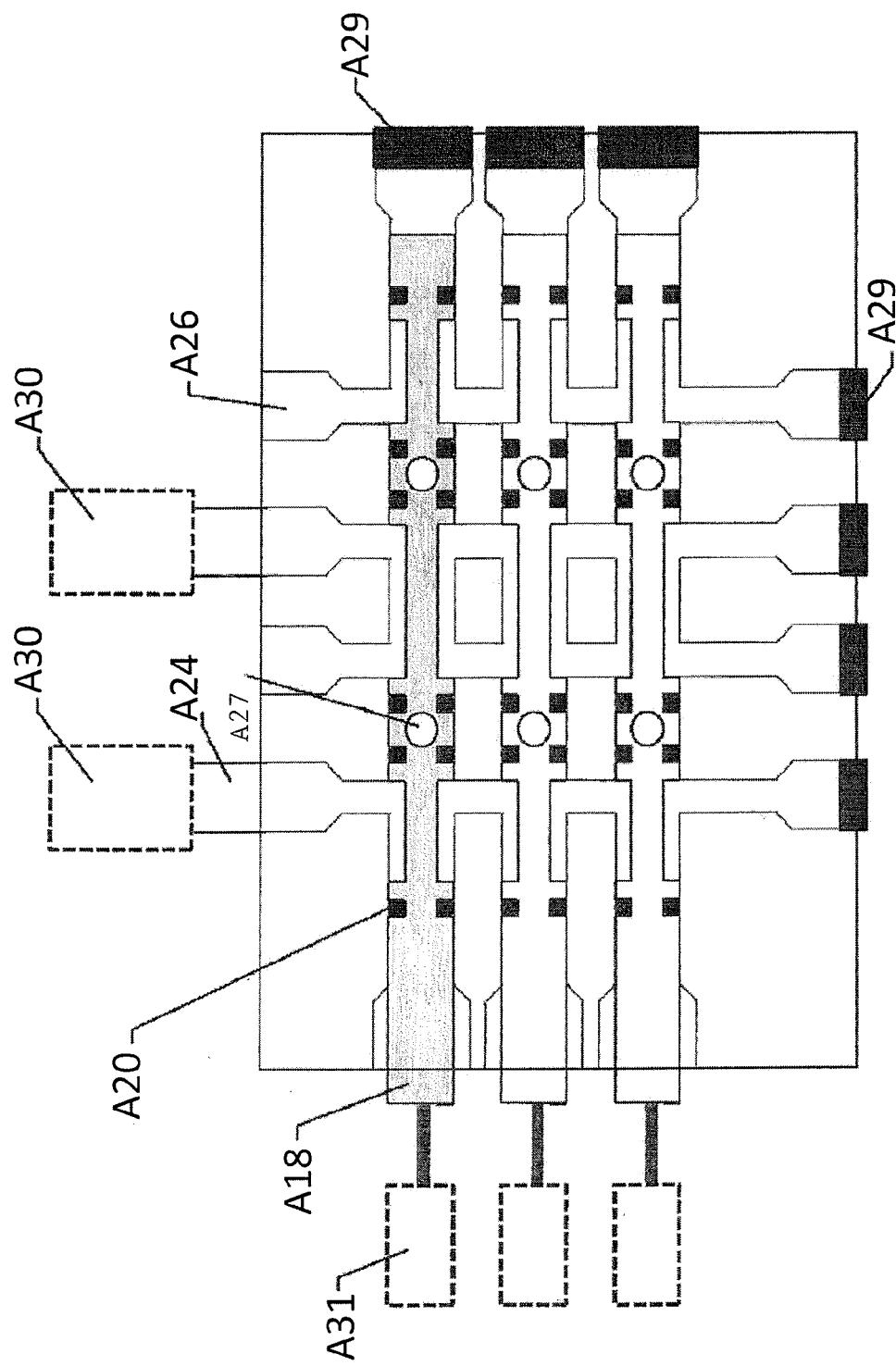
FIG. 12 is an external perspective cross-cut view of the inflation manifold with piston shafts inserted and valves and actuators connected.

FIG. 12 shows a cross-cut view of the inflation manifold with piston shafts inserted in control channels A22 in a neutral position (no pressurized medium flow into or out of the inflatables) and piston actuators A31 attached. The inflow channels A24 are shown with valves A30 attached. One piston shaft is shaded for clarity.

Figure 13:
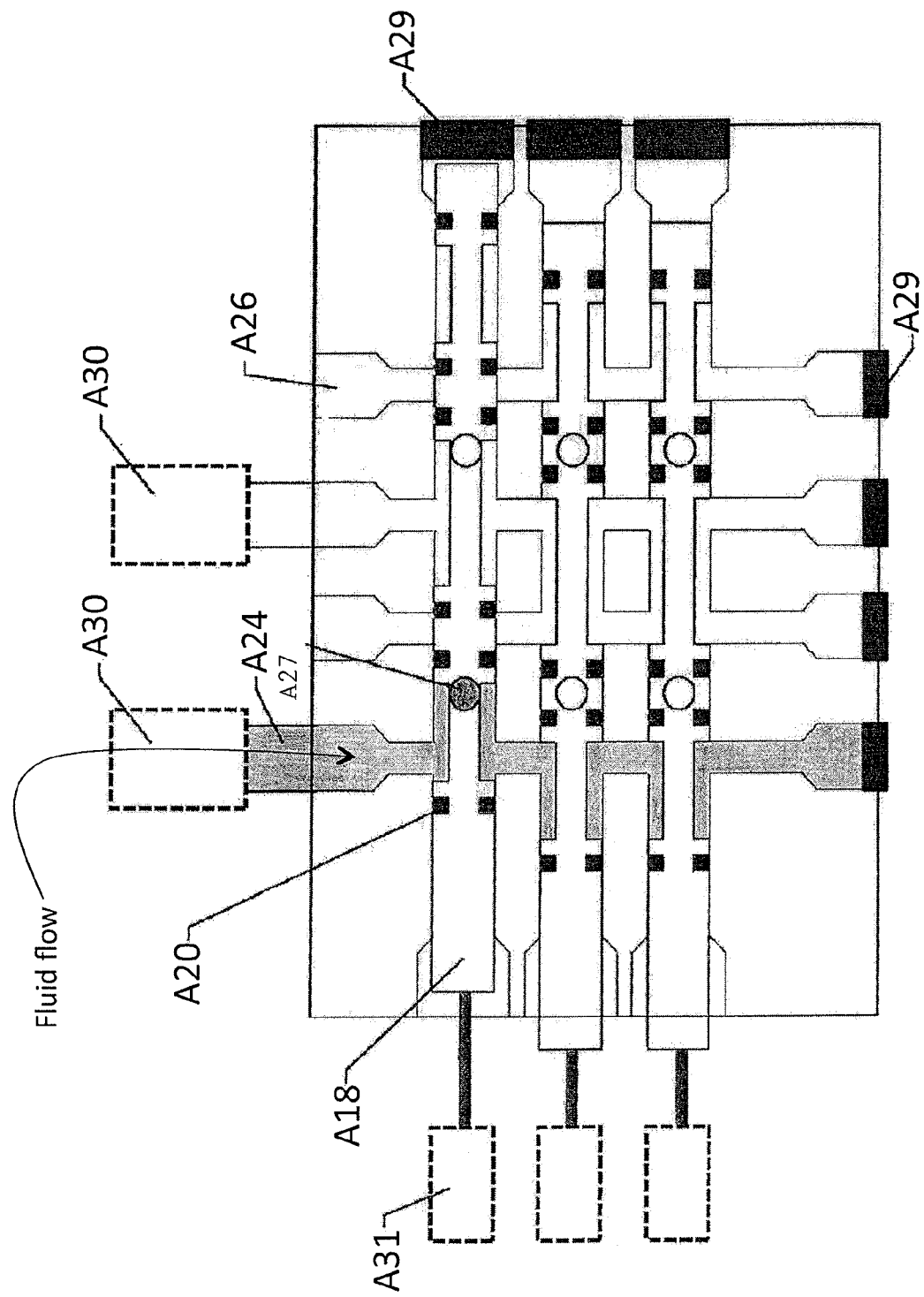
FIG. 13 is an external perspective cross-cut view of the inflation manifold with the piston shafts inserted and with one piston energized to represent the fill position.

FIG. 13 shows a cross-cut view of the inflation manifold with the piston shafts inserted and one piston shaft is energized to represent the fill position. One valve is energized to allow pressurized medium to flow. The channel (separated by ring gaskets) that is filled with pressurized medium is shaded for clarity, and the port A27 connecting the inflatable cell that is being filled is shaded for clarity.

Figure 14:
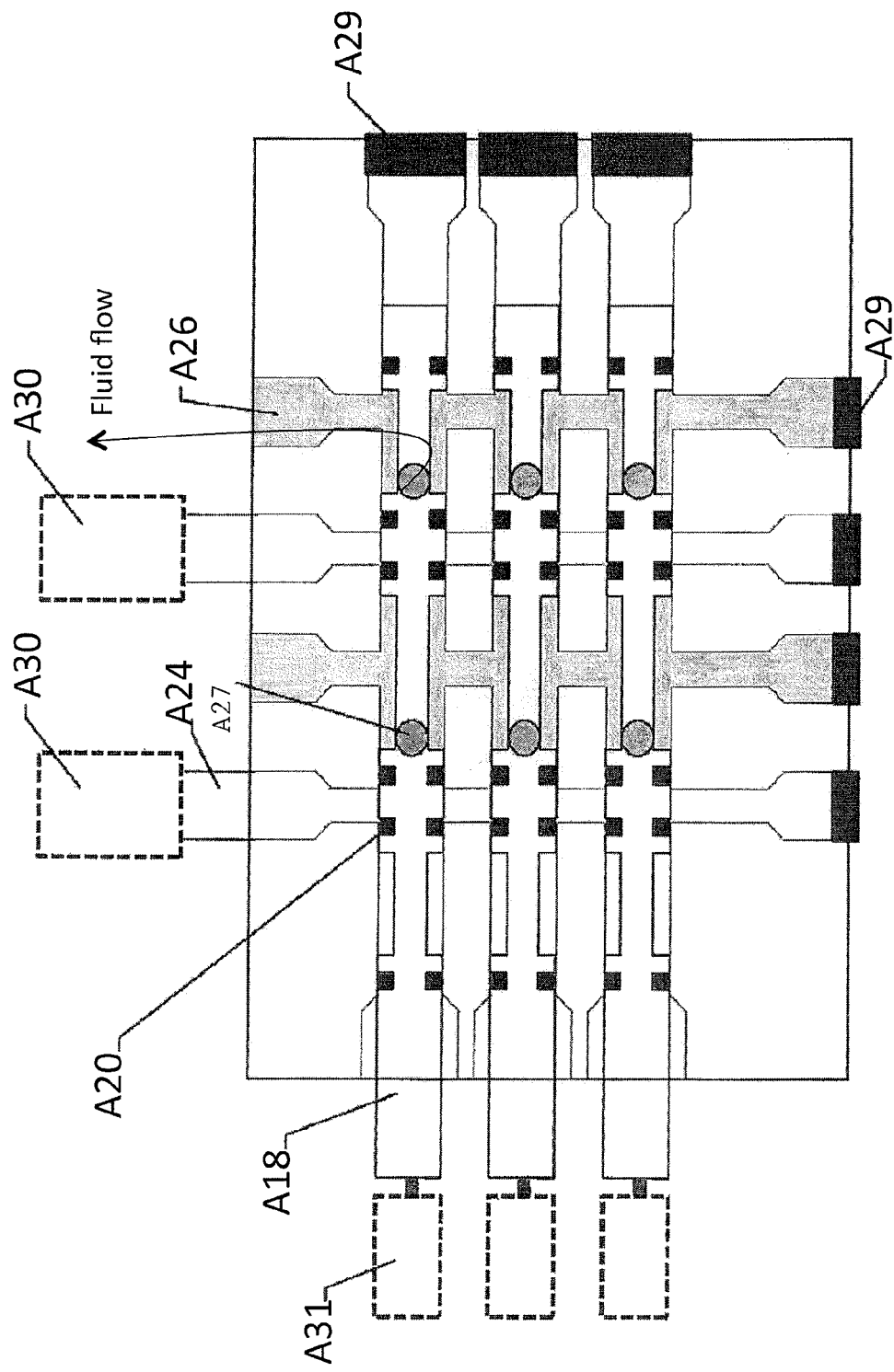
FIG. 14 is an external perspective cross-cut view of the inflation manifold with the piston shafts inserted and with each piston shaft energized to represent the exhaust position.

FIG. 14 shows a cross-cut view of the inflation manifold with the piston shafts inserted and each piston shaft is energized to represent the exhaust position. No valves A30 are energized to hinder pressurized medium flow into the manifold. The channels (separated by ring gaskets) that are being exhausted are shaded for clarity, and the ports A27 connecting the inflatable cells that are being exhausted are shaded for clarity.

In this manner, pressurized medium is controlled to flow into and out of the manifold A6 and is moderated with electronic valves A30, which are controlled by a microcontroller A8 (described below). Valves A30 control whether or not pressurized medium is flowing into the manifold as well as what channel it flows into. Electronic actuators A31 control pressurized medium flow into the inflatable cells A12 by shifting in a direction that opens access to a specific port A27. Valves A30 can either be pneumatic and connected to an air compressor as the air source for gaseous fluid, or they can be hydraulic valves connected to a hydraulic pump as a liquid source for liquid fluid. For pressurized medium to reach the inflatables, it must pass through valve A30 and into a specific channel (formed by the seals from the ring gaskets A20 on the piston shaft A18).

Figure 15:
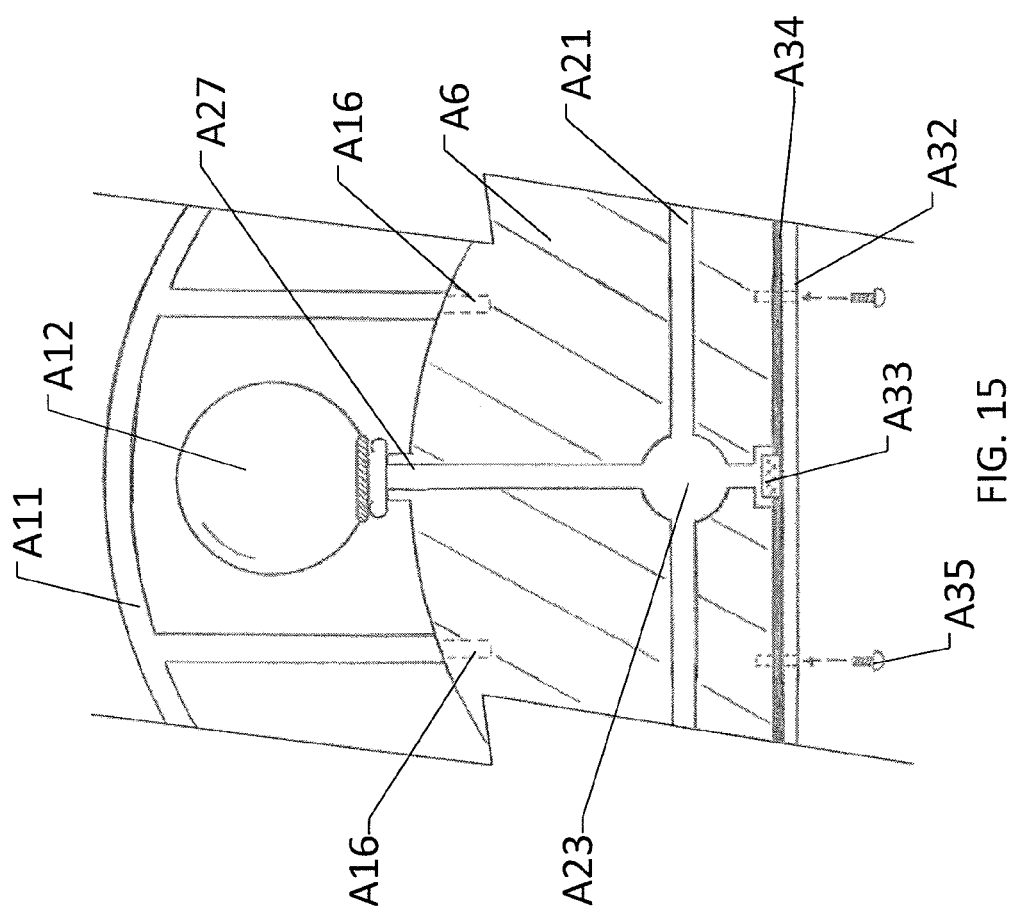
FIG. 15 shows a partial cross-sectional side view of the inflation system with pressure sensor assembly mounted underneath the inflation manifold block.

FIG. 15 is a partial cross-section side view of the inflation system showing a pressure sensor assembly for detecting the pressure of the medium in the inflatable balloon A12, and also detecting by differential pressure when the inflatable cell is pressed by a user during simulation training. Inside of the manifold A6, ports are machined into the bottom of the manifold block A6 so that they each connect to and align with the port A27 connecting to the elastic inflatable balloon A12. A mounted grid array of pressure sensors A32 fastened in position by screws A35 or the like to the bottom plane A32 of the manifold A6. A gasket A34 is used to prevent leakage of pressurized medium. Each sensor A33 is isolated and directly in-line with the pressurized channel allowing for pressure control feedback of each inflation cell. Using this connection method the pressure sensor A33 is able to evaluate the pressure of the inflatable A12 it is connected to without having to be located inside the inflatable itself.

Figure 16:
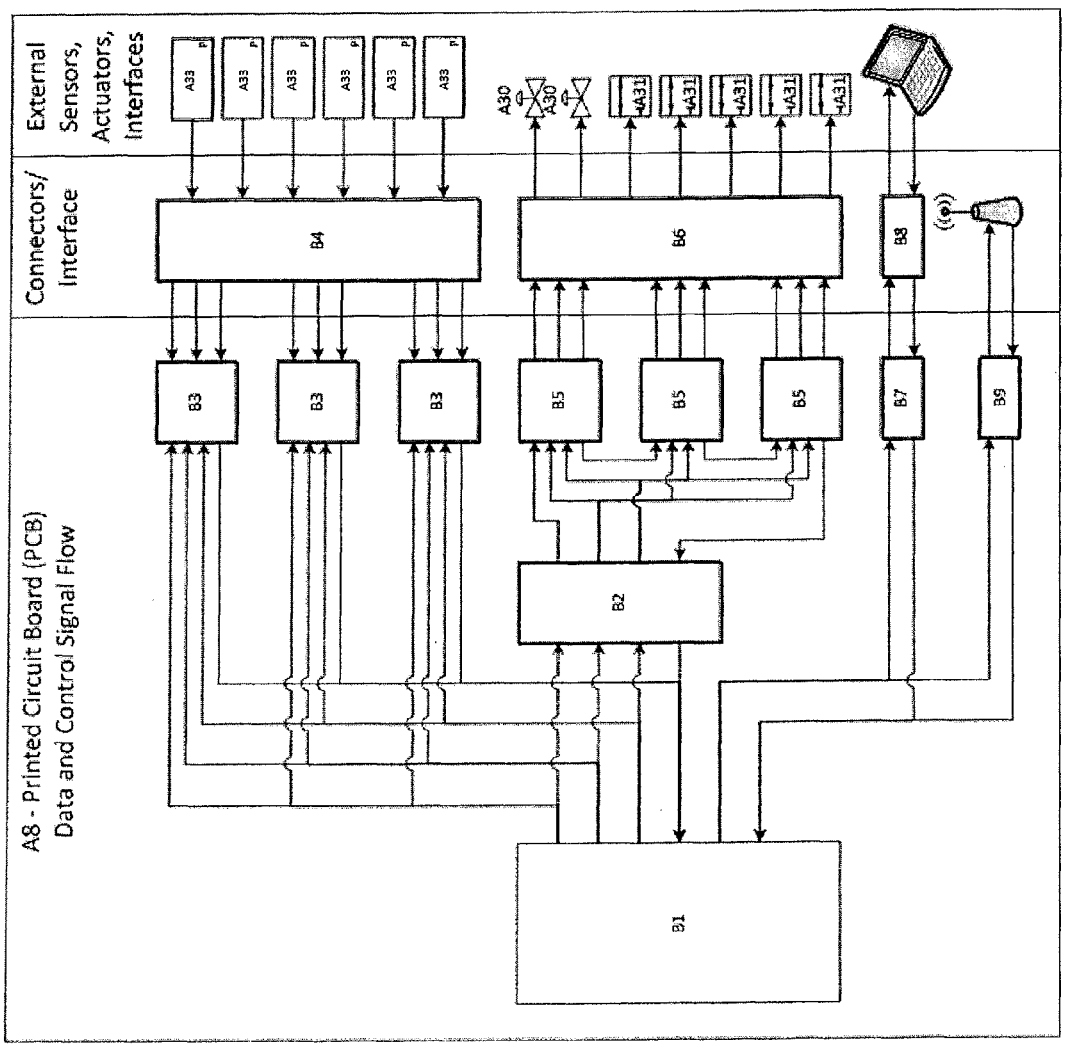
FIG. 16 is a functional block diagram showing the components of an example of the electronic control module.

The electrical components which connect to the manifold and mechanical components can be mounted in the upper region of the hollow manikin. There are two main parts to this area: the printed circuit board A8 and the manifold A6 all connected by wires. As shown in FIG. 16, the PCB A8 will contain the microcontroller and integrated circuits required to control the dynamics of the system. The manifold will contain the actuators, valves, piston shafts, and the pressure sensors A32.

During a simulation run, the user selects a preset ailment or uses a custom setup via the GUI. The microcontroller then commands the specified actuators and valves to let pressurized medium flow through the manifold and into the proper inflatable cells A12. The fluid flows into the inflatable until the pressure sensor A33 tells the microcontroller B1 that the proper pressure has been reached, at which time the piston shaft A17 for that particular inflatable will close, leaving it inflated at a specific pressure. The system then successively alternates to each set of inflatables until the ailment is properly simulated. When the simulation is finished, the entire grid is opened (i.e., all actuators A31 are energized), the valves A30 are closed to stop pressurized medium flow into the manifold. This causes the pressure differential between the inflatable cells A12 and the exhaust channels to reverse, which deflates all inflatables.

The system can be compared to a coordinate grid, where each inflatable is located at position (x,y), where x is the piston shaft A17 corresponding to row x, and y is the valve fill channel A23 corresponding to column y. Using this solution, any inflatable in the array can be sourced with fluid by actuating one valve A30 and one actuator A31. This also reduces the amount of mechanical parts needed, which reduces the cost.

Software Control (Embedded System)

As shown in an example depicted in FIG. 16, the functions of the printed circuit is board A8 are controlled by an on-board microcontroller B1. The microcontroller B1 is directly connected to the external analog to digital converters (ADC) B3. Each ADC B3 will have multiple analog inputs to reduce the number of required devices. The ADCs B3 get analog signals from connector B4, which connects to pressure sensors A33. The input/output expanders B5 are used for controlling the electronic actuators A31 and valves A30 digitally. The electronic actuators A31 push and pull the piston shaft to dictate fluid flow to the inflatable membranes and the electronic valves A30 control pressurized medium flow into the manifold A6. The array of B5 chips are daisy-chained to reduce the number of connections. A30 and A31 are plugged into connector B6 on the PCB. To provide a higher voltage digital signal, the I/O expanders use a higher voltage and are controlled by digital signals amplified through an SPI level converter B2. An external interface to control the board is provided through a UART level converter B7 and USB or Ethernet adapter B8, or using a UART to Bluetooth or WiFi converter from the microcontroller B1.

Software Control (Device to Control PCB)

Figure 17:
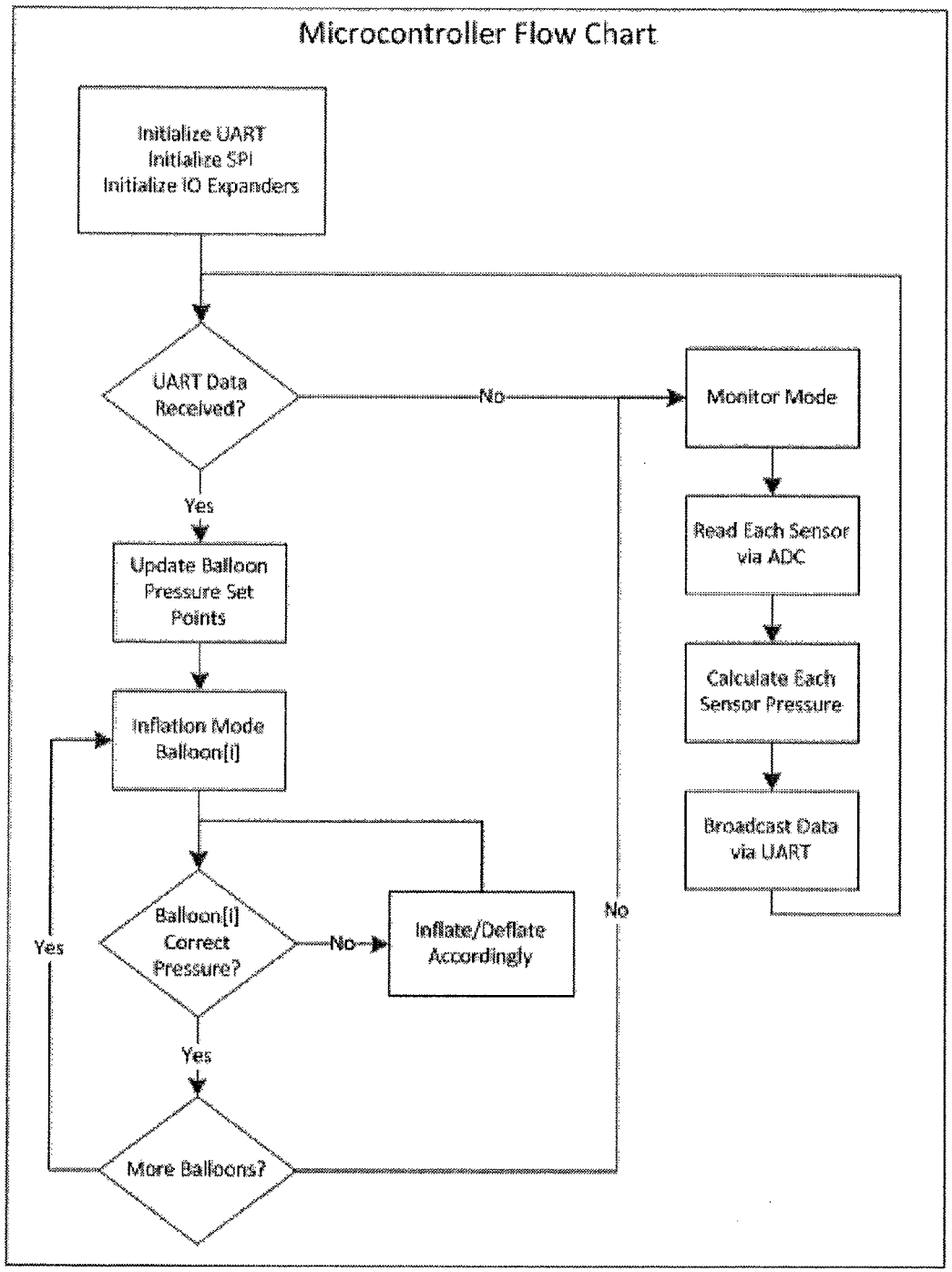
FIG. 17 is a logic diagram showing an example of logic flow control of the embedded system.

FIG. 17 is a flow chart illustrating an example of the logic steps executed by the microcontroller for the embedded system. For a simulation run, the user can select a preset ailment or establish a custom setup via the GUI to initialize the UART, SPI, and I/O expanders of the microcontroller B1. The microcontroller B1 commands the specified valves A30 and actuators A31 to let pressurized medium flow through the manifold and into the proper inflatable cells to their proper set points. Pressurized medium flows into the inflatable cells until the pressure sensor A13 tells the microcontroller that the proper pressure has been reached, at which time the valves A30 and actuators A31 for that particular inflatable cell will close, leaving it inflated at a specific pressure. The system continues to set all the inflatable cells so that the selected ailment is properly simulated. When the simulation is finished, the entire grid is opened (i.e., all the actuators shift the pistons as in FIG. 14). This causes the inflatables A10 to deflate.

TABLE 1 illustrates an example of a software routine in pseudocode that may be programmed for execution by the microcontroller for the embedded inflation system control.

The user control GUI can operate on any associated computer, laptop and/or mobile device to control and monitor the abdominal simulator system. The GUI interface is designed to be intuitive for the first-time user and provide advanced features for more experienced users. A quick-start feature may use a dropdown menu to select an abdominal ailment and a start button to begin simulation. Additional features may allow experienced users to set inflatable parameters to customize their own medical condition simulations. Each inflatable having its own pressure sensor also enables the system to monitor and collect data on which inflatable areas were pressed during a palpation exam. This allows teachers and trainers to determine if the student demonstrated proper technique in their palpation examination, thereby providing an effective simulator training tool for students, teachers, and trainers.

In addition to the tactile sensation for palpation examination that the simulator system provides, various sounds associated to the configured ailment may be emitted from the manikin using software-programmed control of audio segments to attached speakers. Patient monitoring data associated with a dynamically changing condition in a simulation routine may be displayed for the user on the GUI interface. Furthermore, the simulator system may include other video displays on or in tandem with the user interface console for related graphical images (X-rays, etc.) and/or related training videos associated with the ailment simulated on the manikin.

Other embodiments for the array of inflatable elements, inflation manifold, and/or electronic control module may be designed consistent with the principles of the present invention disclosed herein. For example, instead of an x-y grid of inflatable cells, the array of inflatable elements may employ anatomically-correct and/or anatomically-simulated organ and tissue elements for emplacement in the manikin abdominal cavity.

The inflation manifold may be formed as an array valve unit under microprocessor control, which is coupled to the tubings supplying pressurized medium to the inflatable elements. Instead of an embedded unit, the electronic control unit may be configured as an external component integrated with an external computer for the user interface, which communicates by wireless Bluetooth links to electronically-actuated valve actuators embedded with the inflation manifold for the inflatable elements.

The array of inflatable elements may be designed for a wide range of simulated abdominal ailments, such as appendicitis, hernia, and enlarged spleen, as well as other disorders such as ectopic pregnancy, abdominal cancers, tumors, infections, and other ailments that may occur within the torso, both large and small. Other types of patient simulator systems for other areas of the body may be designed consistent with the principles of the present invention, such as for internal surgical training, for tactile cranial, vaginal, birth canal, rectal or intestinal examinations, etc., and/or for tactile examination of animal species, such as livestock.

It is to be understood that many modifications and variations may be devised given the above description of the general principles of the invention. It is intended that all such modifications and variations be considered as within the spirit and scope of this invention, as defined in the following claims.

TABLE 1

```
initialize UART
initialize SPI
initialize IO Expanders
do forever
    update mode
        check UART receiver buffer
        update setpoint array
    end update mode
    inflation mode
        for all i
            update setpoint[i]
            update sensor[i]
            while(sensor[i] != setpoint[i])
                if sensor[i] < setpoint[i]
                    inflate balloon[i]
                else if sensor[i] > setpoint[i]
                    deflate balloon[i]
                update sensor[i]
            end while
        end for
    end inflation mode
    monitor mode
        for each sensor
            update each ADC
            convert ADC to pressure
            transmit sensor
        end for
    end monitor mode
end do forever
```

The invention claimed is:

1. A dynamically-changeable abdominal simulator system comprising: a patient manikin having an abdominal cavity removably covered by a sheet of synthetic skin;
    a grid array of inflatable cells emplaced within the abdominal cavity covering respectively distinct areas of pressurization over a length and a width of a tactile surface of the abdominal cavity, wherein each inflatable cell is supplied with pressurization from a source of pressurization under separate and independent inflation control; and
    an inflation manifold and an electronic control module operable therewith for controlling pressurization supplied separately and independently to the inflatable cells of the grid array from the source of pressurization in order to simulate a wide range of abdominal ailments and/or conditional expressions for the tactile surface of the abdomen of the patient manikin,
    wherein the grid array of inflation cells are each made of semi-rigid material for maintaining a fixed cell shape and contains an inflation balloon for pressurizing cell turgidity.

2. A dynamically-changeable abdominal simulator system according to claim 1, wherein the inflation manifold is provided with electronically controlled actuators to actuate injection of pressurized medium into or discharge it from the inflatable cells through a grid of intersecting channels of tubings.

3. A dynamically-changeable abdominal simulator system according to claim 2, wherein the electronically controlled actuators control movement of respective piston shafts each having larger-diameter sections for blocking the flow of pressurized medium and smaller-diameter sections for allowing the flow of pressurized medium into inflation channels communicating into the inflation cells.

4. A dynamically-changeable abdominal simulator system according to claim 2, wherein each channel of tubing is provided with a pressure sensor for detecting pressurization in the corresponding inflatable cell.

5. A dynamically-changeable abdominal simulator system according to claim 1, wherein a small subdural inflatable layer is provided in a location of the lower abdomen to present a symptom of localized distention in the area of the lower abdomen.

6. A dynamically-changeable abdominal simulator system according to claim 1, wherein a large subdural inflatable layer is provided spanning the entire surface of the abdomen to present a symptom of overall abdominal distension or a healthy abdomen.

7. A dynamically-changeable abdominal simulator system comprising: a patient manikin having an abdominal cavity removably covered by a sheet of synthetic skin;
    a grid array of inflatable cells emplaced within the abdominal cavity covering respectively distinct areas of pressurization over a length and a width of a tactile surface of the abdominal cavity, wherein each inflatable cell is supplied with pressurization from a source of pressurization under separate and independent inflation control; and
    an inflation manifold and an electronic control module operable therewith for controlling pressurization supplied separately and independently to the inflatable cells of the grid array from the source of pressurization in order to simulate a wide range of abdominal ailments and/or conditional expressions for the tactile surface of the abdomen of the patient manikin,
    wherein the electronic control module has an on-board microprocessor for software-programmed control of simulation routines to be performed on the manikin, and for communication with an external computer that provides a graphical user interface for a user to run simulation routines performed with the manikin.

8. A dynamically-changeable abdominal simulator system comprising: a patient manikin having an abdominal cavity removably covered by a sheet of synthetic skin;
    a grid array of inflatable cells emplaced within the abdominal cavity covering respectively distinct areas of pressurization over a length and a width of a tactile surface of the abdominal cavity, wherein each inflatable cell is supplied with pressurization from a source of pressurization under separate and independent inflation control; and
    an inflation manifold and an electronic control module operable therewith for controlling pressurization supplied separately and independently to the inflatable cells of the grid array from the source of pressurization in order to simulate a wide range of abdominal ailments and/or conditional expressions for the tactile surface of the abdomen of the patient manikin,
    wherein coverings in the shapes of various organs are provided in respective organ locations on the grid array.

9. A dynamically-changeable abdominal simulator system according to claim 8, wherein single-cell coverings are provided for smooth edge transitions surrounding an organ covering.

10. A dynamically-changeable abdominal simulator system according to claim 8, wherein the grid array is formed with a single tactile surface covering over the entire abdominal area.

11. A dynamically-changeable abdominal simulator system according to claim 10, wherein the grid array is attached to the manifold using press fitment pegs.

12. A dynamically-changeable abdominal simulator system according to claim 8, wherein the organ coverings are attached to the manifold using press fitment pegs.

13. A dynamically-changeable abdominal simulator system according to claim 8, wherein the organ coverings are one or more of the group consisting of a liver, a spleen, kidneys, and a bladder.

14. A dynamically-changeable abdominal simulator system according to claim 8, wherein an organ covering is pressurized by a plurality of inflation balloons to present an organ condition of differential turgidity.

\* \* \* \* \*